R. H. ROBINSON.
OIL CUP.
APPLICATION FILED NOV. 8, 1920.

1,391,643.

Patented Sept. 20, 1921.

Inventor
Ralph H. Robinson
By S. Arthur Baldwin
Attorney

UNITED STATES PATENT OFFICE.

RALPH H. ROBINSON, OF JAMESTOWN, NEW YORK.

OIL-CUP.

1,391,643.

Specification of Letters Patent. Patented Sept. 20, 1921.

Application filed November 8, 1920. Serial No. 422,474.

*To all whom it may concern:*

Be it known that I, RALPH H. ROBINSON, a citizen of the United States, residing at the city of Jamestown, in the county of Chautauqua and State of New York, have invented certain new and useful Improvements in Oil-Cups, of which the following, taken in connection with the accompanying drawings, is a specification.

The invention relates to oil cups for shackle or king bolts and similar uses; and the object of the improvement is to provide an oil cup which will be operated automatically and with absolute certainty by the movement of the vehicle, particularly for use upon automobiles and other vehicles using springs and upon parts which are liable to become dry and wear or rattle, squeak or complain in a manner deleterious to the comfort of the occupants of the vehicle; and the invention consists in the novel features and combinations hereinafter set forth and claimed.

Figure 1:
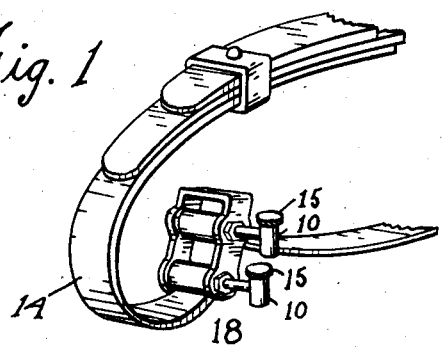
Figures 2, 3:
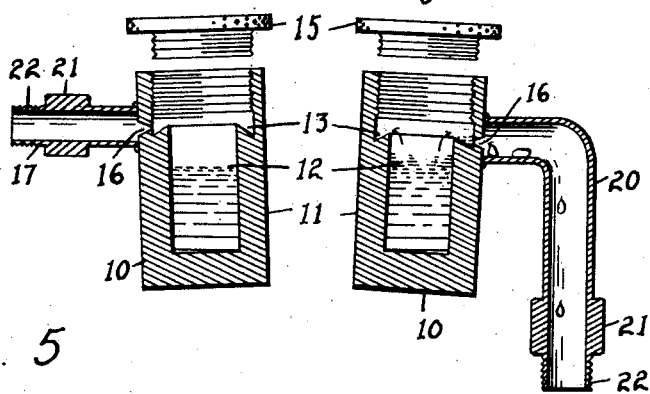
Figures 4, 5:
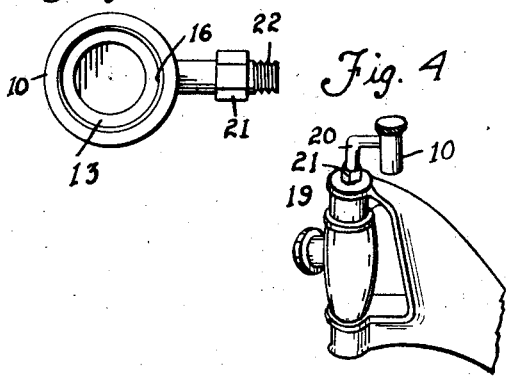

In the drawings, Figure 1 is a perspective view of the end of a spring of the automobile type having shackle bolts provided with the improved oil cups for oiling the same. Fig. 2 is a sectional view of the oil cup and tubular connection therefrom showing the construction and arrangement of the same as arranged for use upon shackle bolts; and Fig. 3 is a similar view of the oil cup as arranged for use upon king bolts and other vertical bolts that need oiling; and Fig. 4 is a perspective view of a king bolt in an automobile showing the oil cup with the angular tubular connection therefrom in position for oiling said king bolt. Fig. 5 is a top plan view of the oil cup with the cap removed showing the annular groove around the inner wall a spaced distance from the top thereof and the diminutive opening from said groove into the connective tube.

Like characters of reference refer to corresponding parts in the several views.

The numeral 10 designates the oil cup which consists of the receptacle 11 having the oil holding cavity 12 therein in the lower portion and the annular groove 13 a spaced distance from the upper end of the cavity 12 to receive therein a small portion of the oil from the contents in the lower portion of said receptacle when it is dashed upward by the resilient action of the spring 14 or by the vibration of the vehicle.

A cap, preferably a screw cap, 15 is provided for closing the threaded upper end of said interior cavity to fit with a close joint therein. A diminutive opening 16 is provided through the side wall of the cup 11 and extends into the annular groove 13 preferably near its bottom and also preferably enlarges outwardly as if made by a countersunk drill.

The tube or conduit 17 is welded or otherwise attached to the cup 11 around the hole 16 to receive the oil therefrom and carry it to the bolt or other part to which the cup 11 is attached in order to oil the same. For shackle bolts 18 the tube 17 is preferably straight. For king bolts 19 and other vertical bolts the tube or conduit 20 is preferably angular or curved. Whether straight or angular or any other form, said tube is preferably provided with a hexagonal or squared portion 21 so that the threaded end 22 of the tube 16 or 20 can be quickly and easily screwed into a screw threaded opening leading to the bolt or other portion to be oiled.

The cup 11 is preferably attached to the tube 17 or 20 at a slight angle to incline said cup so that the oil will invariably flow toward the opening 16 in the groove 13. Such a slight inclination is scarcely noticeable and attains the object, which object might be obtained by cutting said groove 13 higher on the side opposite said opening 16 and inclining the groove toward said opening thereby permitting the oil cup to stand vertically, but this would cost more. The oil cup could be struck up by suitable dies without departing from my invention.

It is apparent that this simple oil cup can be attached to any portion of the vehicle that is likely to need continuous oiling and the size of the receptacle or oil cup can be proportioned to the need so that by filling the lower portion of the cavity 12 in the oil cup, the oil will not normally run out through the hole 16, but only that portion that is thrown or dashed upward by the movement of the vehicle into the groove 13 will run out of the same and its exit will be retarded to a slow seepage by the diminutive size of said hole 16, thereby automatically attaining the purpose and rendering it exceedingly easy to continuously oil the parts. The oil cups 11 only need to be filled about once a month, which filling can be very quickly and easily accomplished, whereas to oil all the parts of an automobile which need lubrication takes usually a number of hours if faithfully accomplished.

The slow seepage of the automatic feed of the oil cup 11 renders its use advantageous in place of grease cups, the oil automatically working or seeping through joints which grease will not permeate.

I claim as new:

1. An oil cup comprising a cup having an annular groove around its inner periphery at an incline, said cup having an opening from the lower side of said groove into a conduit from said oil cup to the part to be oiled.

2. An oil cup comprising a cup having a groove which opens upwardly around the upper portion of its inner periphery, said cup having a diminutive opening from said groove into a conduit to the part to be oiled.

3. An oil cup for bolts and similar parts in automobiles comprising a receptacle having an annular groove around its inner periphery near the upper portion thereof to provide an oil holding cup below said groove, said receptacle having a diminutive hole through the side thereof into said groove, a tubular conduit attached to said oil cup around said diminutive hole to conduct the oil to the part to be lubricated, and a removable cap for said receptacle.

4. An oil cup for bolts and similar parts in automobiles comprising a receptacle having an annular groove around its inner periphery near the upper portion thereof to provide an oil holding receptacle below said groove, said receptacle having a diminutive hole through the side thereof into said groove which enlarges outwardly, a tubular conduit attached to said oil cup around said diminutive hole at an angle of inclination to conduct the oil to the part to be lubricated, a removable cap for said receptacle, said tubular conduit having an angular portion thereon for attaching said oil cup to the part to be lubricated.

In testimony whereof I have affixed my signature in the presence of two witnesses.

RALPH H. ROBINSON.

Witnesses:
C. V. SWANSON,
THEO. THOMAS HAAG.